(12) United States Patent
Wang He

(10) Patent No.: US 8,789,961 B2
(45) Date of Patent: Jul. 29, 2014

(54) DIRECT-TYPE LED BACKLIGHT MODULE

(71) Applicant: Hon Hai Precision Industry Co., Ltd., New Taipei (TW)

(72) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/786,384

(22) Filed: Mar. 5, 2013

(65) Prior Publication Data

US 2014/0111973 A1    Apr. 24, 2014

(30) Foreign Application Priority Data

Oct. 18, 2012    (TW) .................................. 101138531

(51) Int. Cl.
*G09F 13/04*    (2006.01)
(52) U.S. Cl.
USPC ...................... 362/97.3; 362/310; 362/296.05
(58) Field of Classification Search
USPC .................... 362/97.3, 296.05, 310, 612, 613
See application file for complete search history.

(56) References Cited

U.S. PATENT DOCUMENTS

| | | | | |
|---|---|---|---|---|
| 8,044,424 | B2 * | 10/2011 | Urano et al. | 257/98 |
| 8,646,940 | B2 * | 2/2014 | Jang | 362/235 |
| 2011/0069496 | A1 * | 3/2011 | Ing et al. | 362/311.02 |
| 2014/0022796 | A1 * | 1/2014 | Gandini | 362/311.02 |

* cited by examiner

*Primary Examiner* — Evan Dzierzynski
(74) *Attorney, Agent, or Firm* — Novak Druce Connolly Bove + Quigg LLP

(57) ABSTRACT

A direct-type LED backlight module includes a supporting base having a supporting face, an LED mounted on the supporting face of the supporting base, and a dome-like light guiding cover positioned on the supporting face of the supporting base and covering the LED. The light guiding cover defines a plurality of through holes for permitting light emitted from the LED to pass through light guiding cover. The through holes are spaced from each other and arranged in a number of imaginary concentric circles relative to a center of the light guiding cover. An inner face of the light guiding cover facing the LED is coated with a reflective film. A semispherical light reflecting portion protrudes downwardly from an inner face of a top portion of the light guiding cover towards the LED.

15 Claims, 4 Drawing Sheets

DIRECT-TYPE LED BACKLIGHT MODULE

BACKGROUND

1. Technical Field

The present disclosure generally relates to backlight modules and, more particularly, relates to a direct-type backlight module for illuminating a display, wherein the backlight module uses an LED as a light source.

2. Description of the Related Art

Generally, a light source such as an LED (light emitting diode) can be adapted to a direct-light type backlight module for illuminating a display such a flat display, for example, a liquid crystal display (LCD). Since the light-emitting angle of the LED is not larger than 120 degrees, the far-field pattern of the LED is quite narrow; there is nearly no light out of 120 degrees. In other words, the light-emitting area of the LED is highly concentrated.

What is needed, therefore, is an improved direct-type LED backlight module which overcomes the above described shortcomings.

DETAILED DESCRIPTION

An embodiment of a direct-type LED backlight module in accordance with the present disclosure will now be described in detail below and with reference to the drawings.

Figure 1:
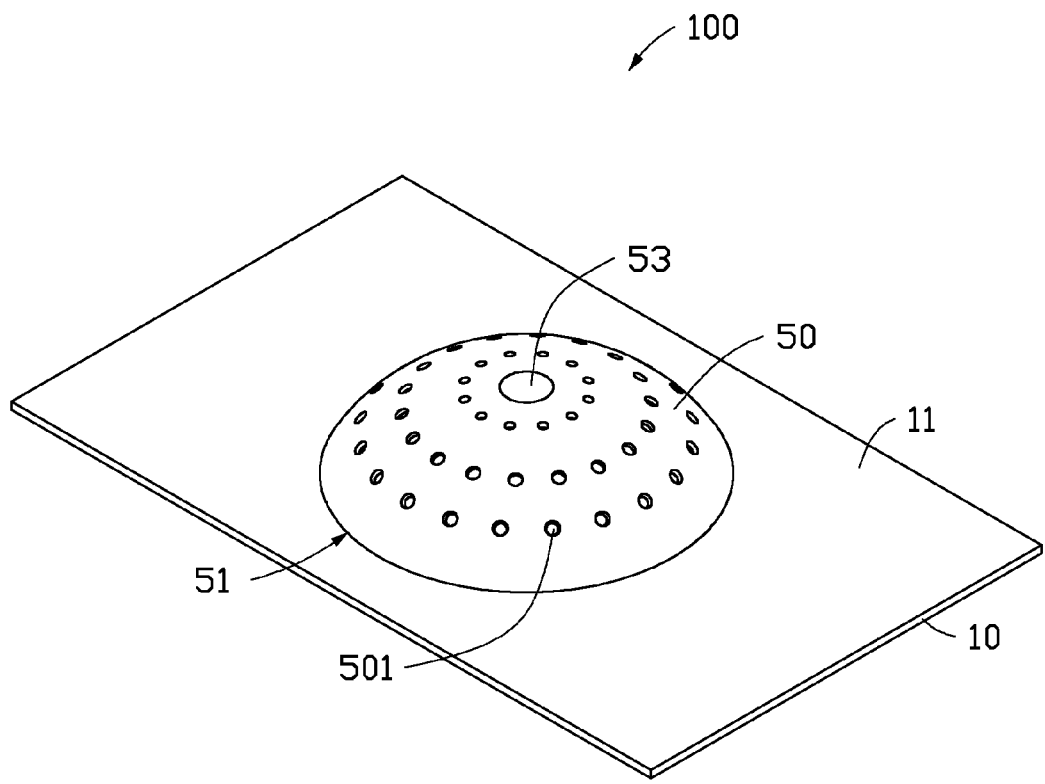
FIG. 1 is an assembled, isometric view of a direct-type LED backlight module in accordance with an exemplary embodiment of the disclosure.
Figure 2:
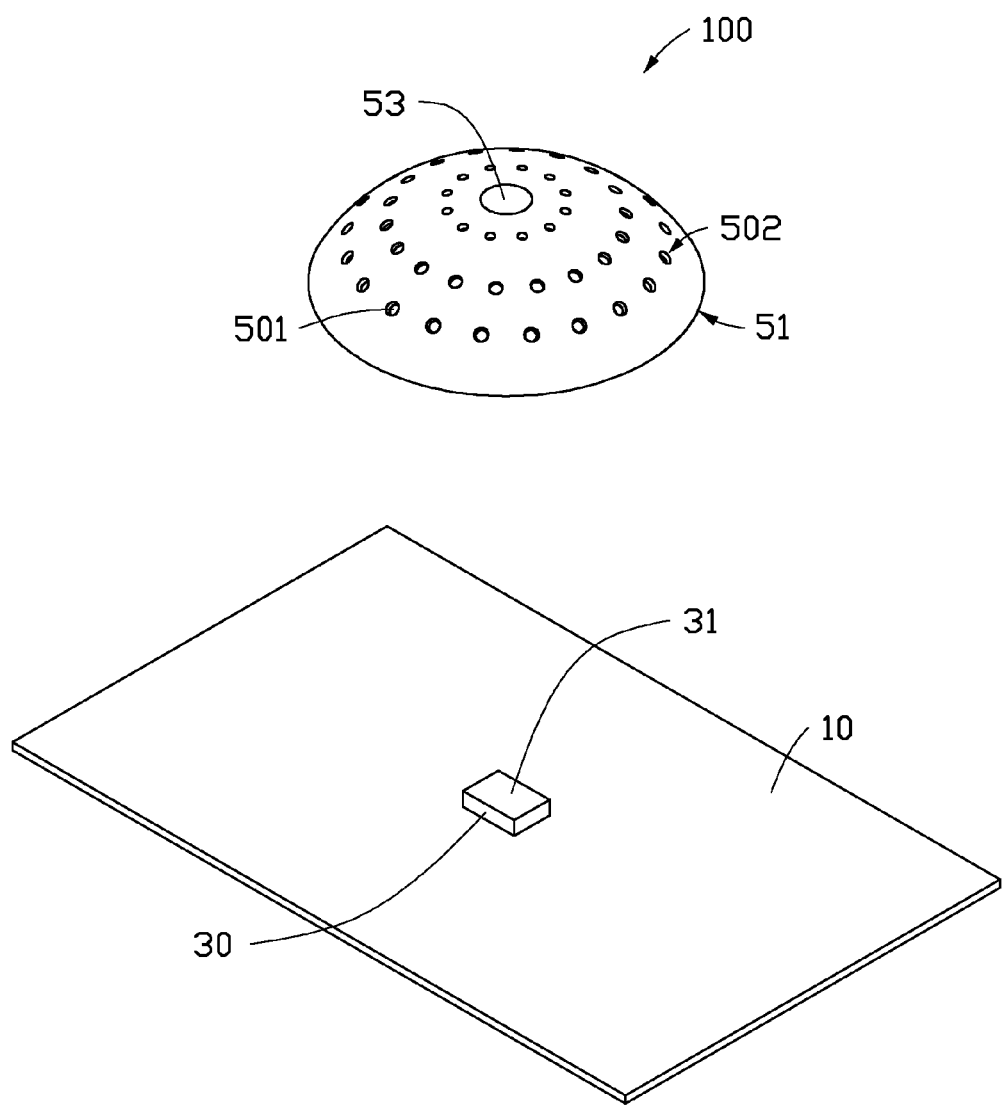
FIG. 2 is an exploded view of the direct-type LED backlight module of FIG. 1.

Referring to FIGS. 1 and 2, a direct-type LED backlight module 100 in accordance with an exemplary embodiment of the disclosure is shown. The direct-type LED backlight module 100 comprises a supporting base 10, a light source 30 disposed on the supporting base 10, and a light guiding cover 50 positioned on the supporting base 10 and covering the light source 30.

Figure 3:
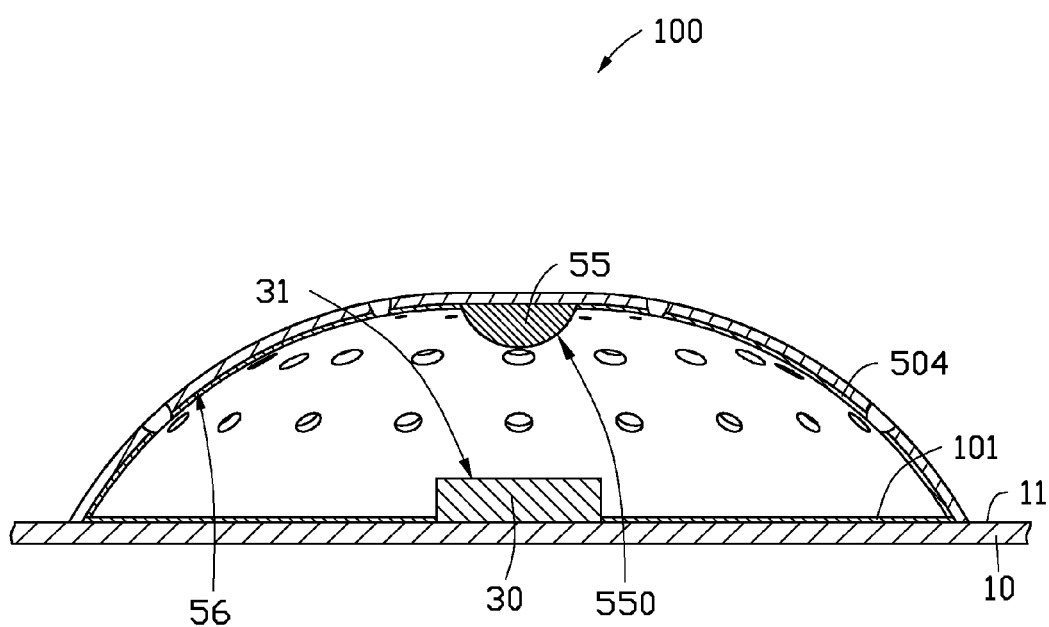
FIG. 3 is a cross-sectional view of the direct-type LED backlight module of FIG. 1.

Referring to FIG. 3 also, the supporting base 10 is a rectangular plate and has a supporting face 11. The supporting base 10 is made of opaque materials. A center of the supporting face 11 is further coated with a first reflecting film 101. The first reflecting film 101 is positioned corresponding to an area covered by the light guiding cover 50. It could be understood that, the supporting face 11 can be entirely coated with the first reflecting film 101.

The light source 30 has a light emitting face 31 facing the light guiding cover 50. In this embodiment of the present disclosure, the light source 30 is a light emitting diode (LED).

Figure 4:
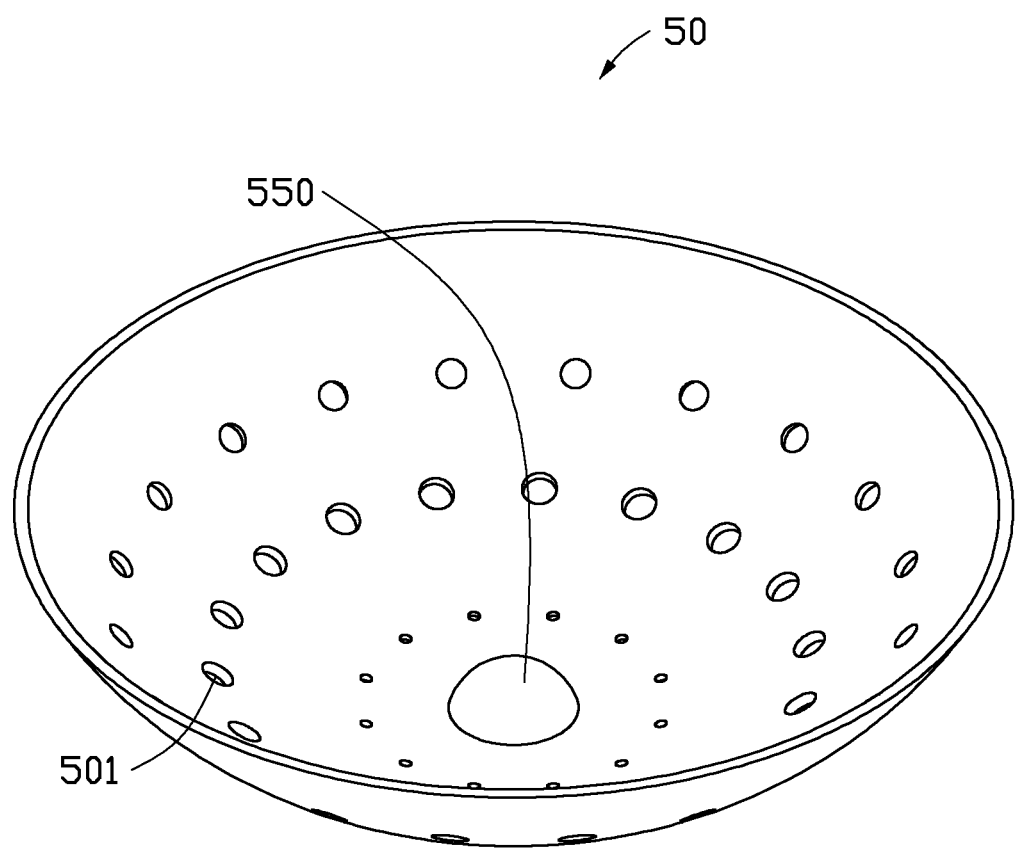
FIG. 4 is an isometric view of a light guiding cover of the direct-type LED backlight module of FIG. 1, viewed from another aspect.

Referring to FIG. 4 also, the light guiding cover 50 is made of opaque materials. The light guiding cover 50 has a dome-like configuration. A bottom end 51 of the light guiding cover 50 is annular, and attached on the supporting face 11 of the supporting base 10. The bottom end 51 is located at a periphery of the light guiding cover 50. A top portion 53 of the light guiding cover 50 is located right over the light source 30. The light guiding cover 50 further comprises a light reflecting portion 55 protruding downwardly from an inner face of the top portion 53 of the light guiding cover 50 towards the light source 30. The top portion 53 is located at a center of the light guiding cover 50. The light reflecting portion 55 has a configuration like a hemisphere. The light reflecting portion 55 is made of highly reflective materials. A spherical outer face 550 of the light reflecting portion 55 right faces the light emitting face 31 of the light source 30. The light guiding cover 50 defines a plurality of through holes 501 for permitting light emitted from the light source 30 to pass through the light guiding cover 50 to illuminate a display (not shown), for example, a liquid crystal display (LCD). The through holes 501 are spaced from each other. The through holes 501 are arranged in a number of imaginary concentric circles 502, relative to the light reflecting portion 55 or the light source 30. In each circle 502, the through holes 501 are evenly distributed. A diameter of each through hole 501 in a circle 502 is equal. A diameter of each through hole 501 in the concentric circles 502 gradually decreases along a direction from a bottom to a top of the light guiding cover 50, i.e. a direction away from a periphery to a center of the light guiding cover 50. An inner face 56 of the light guiding cover 50 is coated with a second reflecting film 504.

In this embodiment of the present disclosure, a radius of the light reflecting portion 55 is 5 mm, a diameter of a circle enclosed by the bottom end 51 of the light guiding cover 50 is 60 mm, and a height of the light guiding cover 50 is 10 mm.

Since the light rays emitted from the light source 30 are sufficiently mixed together inside the light reflecting cove 50 by the reflections of the spherical outer face 550, the second reflecting film 504 and the first reflecting film 101 before they are radiated out of the light reflecting cover 50 via the through holes 501, the light from the direct-type LED backlight module 100 is uniform in color and intensity. In addition, the light emitted from the direct-type LED backlight module 100 is diffused by the through holes 501, such that an illumination angle of the direct-type backlight module 100 is widened whereby the direct-type LED backlight module 100 can more evenly illuminate the display.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A direct-type LED (light emitting diode) backlight module comprising:
   a supporting base having a supporting face;
   an LED mounted on the supporting face of the supporting base; and
   a dome-shaped light guiding cover positioned on the supporting face of the supporting base and covering the LED, wherein the light guiding cover defines a plurality of through holes for permitting light emitted from the LED to pass through the light guiding cover, the through holes are spaced from each other and arranged in a number of imaginary concentric circles relative to a center of the light guiding cover.

2. The direct-type backlight module according to claim 1, wherein a diameter of each through hole in the concentric circles gradually decreases along a direction from a bottom to a top of the light guiding cover.

3. The direct-type backlight module according to claim 2, wherein a diameter of each through hole in a circle is equal.

4. The direct-type backlight module according to claim 1, wherein the through holes are evenly distributed in each circle.

5. The direct-type backlight module according to claim 1, wherein the light guiding cover further comprises a light reflecting portion protruding downwardly from an inner face thereof towards the LED.

6. The direct-type backlight module according to claim 5, wherein the light reflecting portion has a configuration like a hemisphere, and a spherical outer face of the light reflecting portion right faces the LED.

7. The direct-type backlight module according to claim 5, wherein the light reflecting portion is made of highly reflective materials.

8. The direct-type backlight module according to claim 1, wherein the supporting face of the supporting base is coated with a first reflecting film.

9. The direct-type backlight module according to claim 8, wherein the first reflecting film is positioned corresponding to an area covered by the light guiding cover.

10. The direct-type backlight module according to claim 1, wherein an inner face of the light guiding cover is coated with a second reflecting film.

11. The direct-type backlight module according to claim 1, the supporting base is made of opaque material.

12. An LED module comprising:
a supporting base having a supporting face;
an LED mounted on the supporting face; and
a light guiding cover mounted on the supporting face and covering the LED, the light guiding cover having a dome-shaped configuration with a circular bottom end attached to the supporting base, a light reflective and semispherical protrusion extending downwardly from a central top of the light guiding cover toward the LED, an inner face of the light guiding cover facing the LED being light reflective, and a plurality of through holes being defined in the light guiding cover for radiation of light generated by the LED out of the light guiding cover.

13. The LED module of claim 12, wherein the supporting face is light reflective.

14. The LED module of claim 12, wherein the through holes are arranged in a plurality of concentric circles.

15. The LED module of claim 13, wherein diameters of the through holes are gradually decreased from a periphery to a center of the light guiding cover.

* * * * *